BEST AVAILABLE COPY

United States Patent [19]

Matsumoto et al.

[11] E Patent Number: Re. 32,493

[45] Reissued Date of Patent: Sep. 1, 1987

[54] DATA PROCESSING UNIT WITH PIPELINED OPERANDS

[75] Inventors: Hideaki Matsumoto; Tadaaki Bandoh; Hideo Maejima, all of Ibaraki, Japan

[73] Assignee: Hitachi, Ltd., Tokyo, Japan

[21] Appl. No.: 873,174

[22] Filed: Jun. 11, 1986

Related U.S. Patent Documents

Reissue of:

[64] Patent No.: 4,454,578
Issued: Jun. 12, 1984
Appl. No.: 265,168
Filed: May 19, 1981

[51] Int. Cl.[4] ..... G06F 9/42; G06F 9/34; G06F 9/36

[52] U.S. Cl. ..... 364/200

[58] Field of Search ... 364/200 MS File, 900 MS File

[56] References Cited

U.S. PATENT DOCUMENTS

| | | | |
|---|---|---|---|
| 3,331,056 | 7/1967 | Lethin et al. | 364/200 |
| 3,739,352 | 6/1973 | Packard | 364/200 |
| 4,025,771 | 5/1977 | Lynch, Jr. et al. | 364/200 |
| 4,109,310 | 8/1978 | England et al. | 364/200 |
| 4,135,242 | 1/1979 | Ward et al. | 364/200 |
| 4,200,927 | 4/1980 | Hughes et al. | 364/200 |
| 4,236,206 | 11/1980 | Strecker et al. | 364/200 |
| 4,241,397 | 12/1980 | Strecker et al. | 364/200 |
| 4,241,399 | 12/1980 | Strecker et al. | 364/200 |
| 4,270,181 | 5/1981 | Tanakura et al. | 364/200 |
| 4,298,927 | 11/1981 | Berglund et al. | 364/200 |
| 4,305,124 | 12/1981 | Marro et al. | 364/200 |
| 4,320,454 | 3/1982 | Suzuki et al. | 364/200 |

OTHER PUBLICATIONS

"B1700 Cobol/RPG-S-Language", 1973, Burroughs Corp., (1058823-015).

"VAX 11 Architecture Handbook", 1979, Digital Equipment Corp.

*Primary Examiner*—Archie E. Williams, Jr.
*Assistant Examiner*—William G. Niessen
*Attorney, Agent, or Firm*—Antonelli, Terry & Wands

[57] ABSTRACT

A data processing unit for executing variable length instructions in which operand specifiers for specifying addressing modes of operands are independent from operation codes for ascertaining operations is disclosed. An instruction fetch unit includes an instruction buffer for prefetching and retaining instructions from a memory and alignment means for aligning the instructions from the instruction buffer such that the instruction includes at least one operand specifier in one machine cycle, and provides it to a decoding unit. The decoding unit includes an operation code decoder and two operand specifier decoders to decode two operand specifiers simultaneously when the last operand specifier is a register designation mode. Each of the units executes instructions in a pipelined fashion and processes operands in a pipelined fashion.

23 Claims, 28 Drawing Figures

BEST AVAILABLE COPY

BEST AVAILABLE COPY

BEST AVAILABLE COPY

BEST AVAILABLE COPY

BEST AVAILABLE COPY

BEST AVAILABLE COPY

BEST AVAILABLE COPY

BEST AVAILABLE COPY

BEST AVAILABLE COPY

BEST AVAILABLE COPY

BEST AVAILABLE COPY

BEST AVAILABLE COPY

BEST AVAILABLE COPY

DATA PROCESSING UNIT WITH PIPELINED OPERANDS

Matter enclosed in heavy brackets [ ] appears in the original patent but forms no part of this reissue specification; matter printed in italics indicates the additions made by reissue.

BACKGROUND OF THE INVENTION

The present invention relates to a data processing unit with pipeline control, and more particularly to a data processing unit which executes variable length instructions having operand specifiers for specifying addressing modes of operands issued independently from operation codes for ascertaining operations.

In a variable length instruction architecture, the instruction length varies even if the length of the operation code is fixed. The leading field of the instruction is an operation code but the other fields have various meanings. Accordingly, the meanings of the fields in the instruction are not uniquely defined. Furthermore, since the operand specifiers in the instruction have variable lengths depending on the addressing mode, the instruction length is variable even if the operation code is fixed.

In an instruction decoding unit which handles such variable length instruction architecture, if an instruction is fetched and decoded parallelly, a large scale hardware is required and a complex control is necessary.

In a system in which an instruction is fetched and decoded one or a plurality of predetermined lengths of units at a time, a long time is required to decode the instruction and hence high speed processing can not be attained. For example, if a basic unit comprises eight bits (byte), a basic instruction has a three to seven-byte length. If the instruction is decoded in synchronism with a machine cycle, the machine cycles which are equal in number to the number of bytes of the instruction are necessary to decode the instruction.

Thus, in the data processing unit which handles the variable length instruction architecture, it is an important factor to increase the speed of the processing of the instruction decoding operation to attain an efficient pipeline processing.

SUMMARY OF THE INVENTION

It is an object of the present invention to provide a data processing unit which can carry out the decoding of the variable instructions at a high speed.

It is another object of the present invention to provide a data processing unit which can carry out the decoding of the instructions regardless of the number of operand specifiers the instructions may have.

It is a further object of the present invention to provide a pipeline controlled data processing unit which prepares one operand per machine cycle regardless of the length of the operand specifier.

It is a still further object of the present invention to provide a data processing unit in which if the addressing mode of the last operand specifier in an instruction is a register mode, the operand specifier of the last operand is also decoded in the decode cycle for the operand specifier of the operand immediately preceding to the last operand so that the instructions are executed at a high speed.

According to one aspect of the present invention, there is provided a data processing unit for executing variable length instructions in which the operand specifiers for specifying the addressing modes of operands are independent from the operation codes for ascertaining operations, and in which not only the instructions but also the operands of the respective instructions are pipeline-controlled.

In accordance with another aspect of the present invention, if the last operand specifier of an instruction is the register mode, the operand specifier of the last operand is decoded in the decode cycle for the operand specifier of the operand immediately preceding to the last operand.

In accordance with a further aspect of the present invention, at least one operand specifier of an operand is decoded in each machine cycle to prepare different operands in order to process a plurality of operands in pipeline.

BRIEF DESCRIPTION OF THE DRAWINGS

The other objects and features of the present invention will be apparent from the following description on preferred embodiments when taken in conjunction with the accompanying drawings, in which:

[FIGS. 1 to 3]

DETAILED DESCRIPTION OF THE PREFERRED EMBODIMENTS

Before explaining the embodiments of the present invention, an instruction set having variable length operand specifiers is first explained. Such an instruction set has been known. The following are two representative examples thereof.

One is an instruction format for a Burroughs Corp. computer B1700 implemented for a COBOL/RPG architecture. It is disclosed in "B1700 COBOL/RPG-S-Language" 1058823-015, Copyright 1973, Burroughs Corp.

The other is an instruction architecture having variable length operand specifiers for a Digital Equipment Corp. computer VAX 11/780. It is disclosed in "VAX 11 Architecture Handbook" Copyright 1979, and U.S. Pat. No. 4,241,399.

FIGS. 1A to 1D show four representative addressing modes in the example of the Burrough Corp. B1700.

Figure 1A:
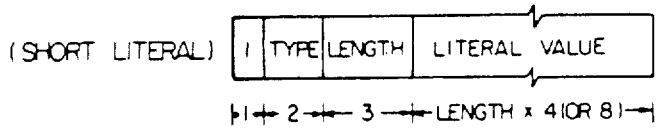
*FIGS. 1A to 1D, 2A to 2F, and 3A to 3F* show examples of formats of operand specifiers of variable length instructions used in the present invention.

FIG. 1A shows an operand specifier for specifying an operand for the short literal mode. A Type field specifies the type of data (presence or absence of sign and identification of basic length of a Literal Value field (4 bits or 8 bits)), and a Length field together with the

BEST AVAILABLE COPY

Type field specifies the length of the Literal Value field. Thus, the Literal Value field length may vary from 4 bits to a maximum of 56 bits (when the Type field specifies 8 bits with sign and the Length field is 7).

Figure 1B:
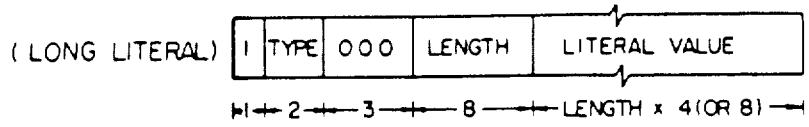

FIG. 1B shows an operand specifier which specifies an operand for the long literal mode. It is used to produce a literal data having a length longer than that specified by the short literal mode.

Figure 1C:
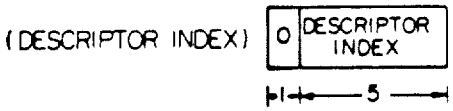

FIG. 1C shows an operand specifier which specifies an operand address for the descriptor index mode. The data at an address specified by an index value from an entry address of a descriptor table is used as an operand.

Figure 1D:
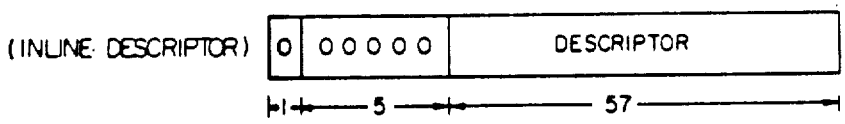

FIG. 1D shows an operand specifier for specifying an operand address for the inline descriptor mode. The data at an address specified by a Descriptor field is used as an operand.

It should be understood that the four addressing modes described above are only representative examples and other modes also exist.

As shown in FIGS. 1A to 1D, the operand specifiers have variable lengths. In the short literal mode of FIG. 1A, the length l (bits) occupied by the instruction field of the operand specifier is 1+2+3+"Length"×4 (or 8), and in the long literal mode of FIG. 1B, the length l is 1+2+3+8+"Length"×4 (or 8), and in the descriptor index mode of FIG. 1C, the length l is 6, and in the inline descriptor mode of FIG. 1D, the length l is 63.

In the instruction architecture described above, the portion which specifies the type of operand or the addressing mode is defined by the operand specifier and it is independent from the operation code. While only the literal modes and the descriptor modes are considered in the above instruction architecture, any other addressing modes may be included.

Figure 2A:
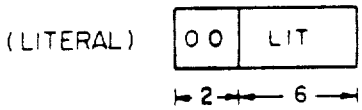
Figure 2B:
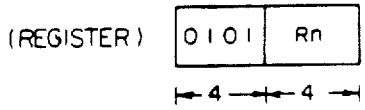
Figure 2C:
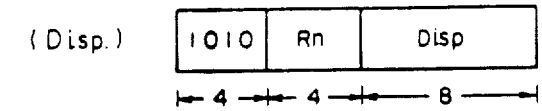
Figure 2D:
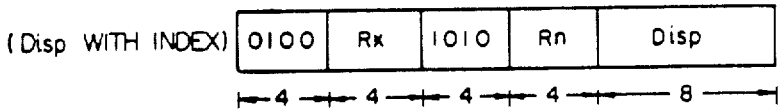
Figure 2E:
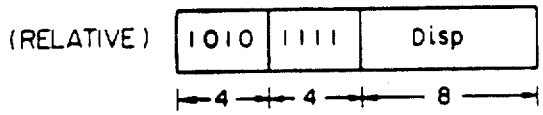
Figure 2F:
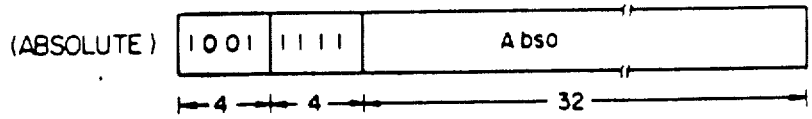

FIGS. 2A to 2F show formats of operand specifiers for six representative addressing modes in the example of the DEC VAX 11. FIG. 2A shows a format of an operand specifier for the literal mode. The six-bit data in a Literal field is used as an operand. FIG. 2B shows the format of an operand specifier for the register mode. Four bits in an Rn field specify an address of a register used as an operand. FIG. 2C shows the format of an operand specifier for the displacement mode. The data at a memory address equal to the sum of the content of a register specified by an Rn field and a displacement specified by a Displacement field is used as an operand. The length of the displacement may be 8-bits as shown in FIG. 2C or it may be 16 bits or 32 bits. FIG. 2D shows an operand specifier for displacement with index mode in which an index modifier is added to the addressing mode of FIG. 2C. A register at an address specified by an Rx field is used as an index register the content of which is added to an address when it is calculated. FIG. 2E shows the format of an operand specifier for the relative mode. The data at an address equal to a sum of the content of the program counter and a displacement specified by a Displacement field is used as an operand. FIG. 2F shows the format of an operand specifier for the absolute mode. An Absolute field specifies a memory address at which an operand is located.

The VAX 11 Architecture is characterized in the fact that the length of the operand specifiers are multiples of a basic length of 8 bits (byte).

As a repertoire of the addressing modes, the B1700 is suitable for COBOL or like languages and the VAX 11 is suitable for FORTRAN and PL/1. FIGS. 3A to 3F show examples of instruction formats which adopt the repertoire of the addressing modes of the VAX 11 and which have bit-variable operand specifier lengths in order to enhance the efficiency of the operand specifiers.

Figure 3A:
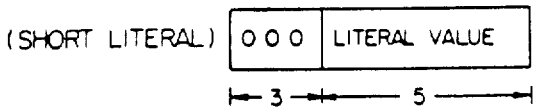
Figure 3B:
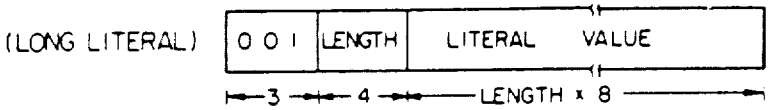

FIGS. 3A and 3B show formats of operand specifiers when operands are presented by literal data. When the literal data is no longer than five bits, a short literal format as shown in FIG. 3A is used, and when the literal data is no shorter than six bits, a long literal format as shown in FIG. 3B is used.

Figure 3C:
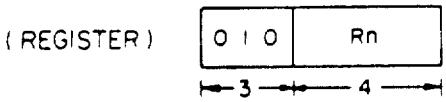
Figure 3D:
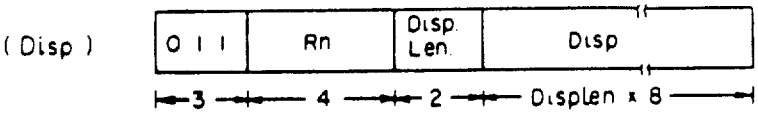
Figure 3E:
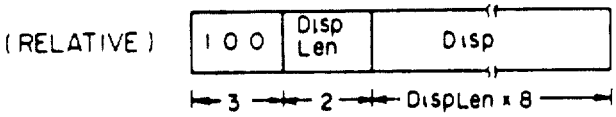
Figure 3F:
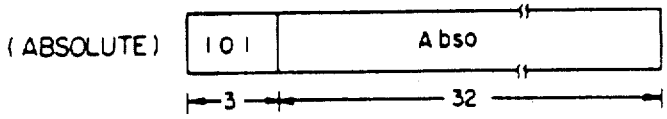

FIG. 3C shows the format of an operand specifier for the register mode. A register at an address specified by an Rn field presents an operand. FIG. 3D shows the format of an operand specifier for the displacement mode. It comprises a register at an address specified by an Rn field, a Displacement Length field for specifying the length of displacement and a Displacement field. FIG. 3E shows the format of an operand specifier for the relative mode. It comprises a Displacement Length field and a Displacement field. FIG. 3F shows the format of an operand specifier for the absolute mode. An Absolute field specifies a memory address at which an operand is located.

The formats of the operand specifiers shown in FIGS. 3A to 3F are only examples of a number of addressing modes and many other operand specifiers exist although they are not explained here because they are not necessary to the understanding of the present invention.

In the instruction formats shown in FIGS. 1 to 3, since the addressing mode is defined for each operand, the independency of the addressing mode is maintained for the operation code and the respective operands. However, the limitation to the access type of the operand such as read operand, write operand or read and write operand is defined by the operation code (dependency to the operation code). Accordingly, the operand must be an addressing mode which satisfies the dependency to the operation code. It should be understood that other access types than the read, write and read and write operands exist.

The length of the operand (data length) may be considered to depend on the operation code or it may be considered to be specified by the operand specifier. Since the difference therebetween does not affect the present invention, the handling of the data length is not explained here.

An embodiment of the present invention is now explained in detail. While a bit is used as a minimum unit to access a memory in the following description, it should be understood that the unit of access may be four bits (nibble) or either bits (byte).

Figure 4:
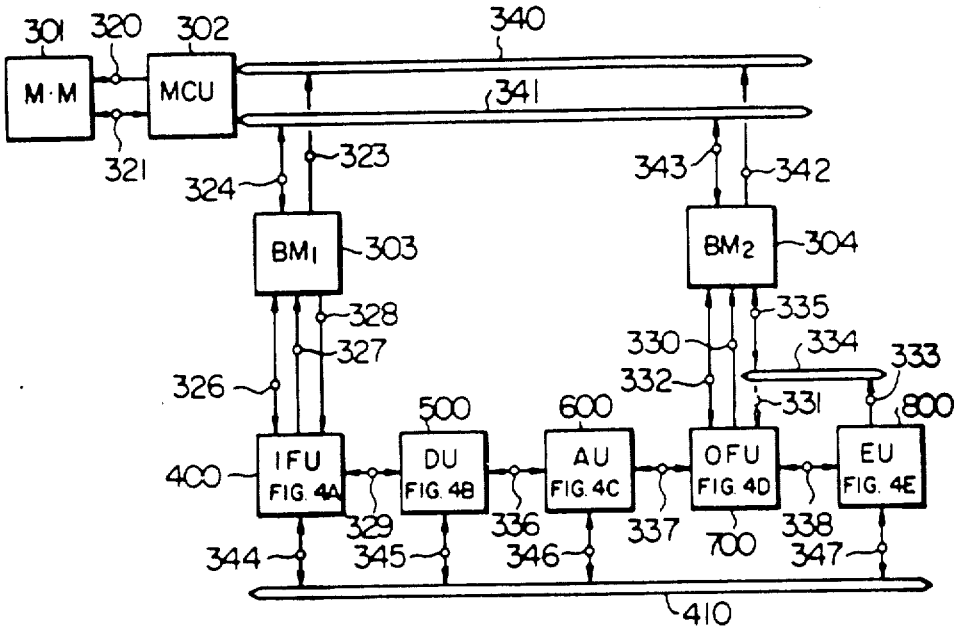
FIG. 4 shows a block diagram of one embodiment of a data processing unit constructed in accordance with the present invention.

FIG. 4 shows a block diagram of one embodiment of a pipeline controlled data processing unit which embodies the present invention. Abbreviations shown in FIG. 4 and their formal names are listed below.

| Reference Numerals | Formal Names | Abbreviations |
|---|---|---|
| 301 | Main memory | MM |
| 302 | Memory control unit | MCU |
| 303 | High speed buffer memory | $BM_1$ |
| 304 | High speed buffer memory | $BM_2$ |
| 400 | Instruction fetch unit | IFU |
| 500 | Instruction decode unit | DU |
| 600 | Address calculation unit | AU |
| 700 | Operand fetch unit | OFU |
| 800 | Execution unit | EU |

BEST AVAILABLE COPY

In FIG. 4, the main memory (MM) 301 stores variable length instructions and operands to be executed by the instructions, and it exchanges data with the high speed buffer memories ($BM_1$, $BM_2$) 303 and 304 under the control of the memory control unit (MCU) 302.

The MCU 302 provides addresses through signal lines 320 and transfers data through signal lines 321. Signal lines 340 form an address bus among the MCU 302 and the $BM_1$ 303 and the $BM_2$ 304, and signal lines 341 form a data bus. The $BM_1$ 303 provides addresses to the address bus 340 through signal lines 323 and transfer data through signal lines 324.

The $BM_2$ 304 provides addresses to the address bus 340 through signal lines 342 and transfers data through signal lines 343. Serially connected blocks from the instruction fetch unit (IFU) 400 up to the execution unit (EU) 800 constitute the pipeline controlled data processing unit.

The instruction fetch unit (IFU) 400 provides instruction addresses to the $BM_1$ 303 through signal lines 327 and receives read-out instructions through signal lines 328 to prefetch the instructions. Signal lines 326 are interface signal lines for control signals between the IFU 400 and the $BM_1$ 303.

The instruction decode unit (DU) 500 receives instructions fetched by the IFU 400 and decodes them for each operation code and each operand specifier. Signal lines 329 are interface signal lines between the DU 500 and the IFU 400.

The address calculation unit (AU) 600 calculates an effective address of an operand in accordance with an operation code decoded by the DU 500 and decoded information of an operand specifier and provides the effective address to the operand fetch unit (OFU) 700. Signal lines 336 are interface signal lines between the DU 500 and the AU 600.

The OFU 700 provides the operand address presented by the AU 600 to the $BM_2$ 304 through a signal line 330 and receives a corresponding operand through a signal line 335, a data bus 334 and signal lines 331. Signal lines 332 are interface signal lines for control signals between the OFU 700 and the $BM_2$ 304.

When the $BM_2$ 304 contains data on the address presented by the OFU 700, it immediately provides the corresponding data to a data bus 334 through the signal lines 335 and the OFU 700 receives the data on the data bus 334 through the signal lines 331. When the $BM_2$ 304 does not contain the data on the corresponding address, it accesses the MM 301 through the MCU 302 to read out the data on that address and presents it to the OFU 700.

The construction and the function of the high speed buffer memory are known, for example, see "A Guide to the IBM System/370 Model 168", copyright 1972, International Business Machines Corp.

The execution unit (EU) 800 receives the operands from the OFU 700 to execute the instructions. Signal lines 338 are interface signal lines between the EU 800 and the OFU 700 for transferring the operands.

An interunit bus 410 is a data transfer bus between the units IFU 400, DU 500, AU 600 and Eu 800. It is connected with the IFU 400 through signal lines 344, with the DU 500 through signal lines 345, with the AU 600 through signal lines 346 and with the EU 800 through signal lines 347.

Those units operate essentially independently to carry out pipelined processing of the operands.

Specific embodiments of the respective units of the data processing unit shown in FIG. 4 are explained with reference to FIGS. 4A to 4E.

Figure 4A:
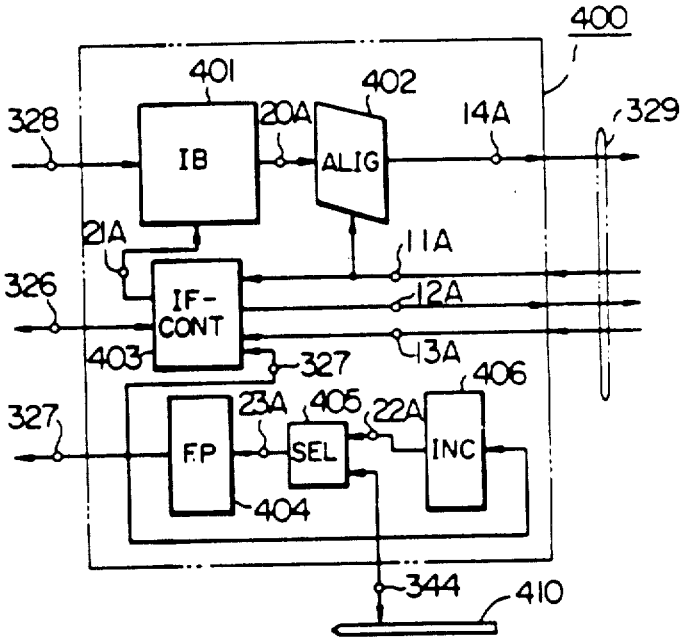
FIGS. 4A to 4E show block diagrams illustrating exemplary details of the respective blocks shown in FIG. 4.

FIG. 4A shows the configuration of the IFU 400. Abbreviations shown therein and their formal names are listed below.

| Reference Numerals | Formal Names | Abbreviations |
|---|---|---|
| 401 | Instruction buffer | IB |
| 402 | Instruction aligner | ALIG |
| 403 | Control circuit | IF-CONT |
| 404 | Fetch pointer | FP |
| 405 | Selector | SEL |
| 406 | Incrementer | INC |

The fetch pointer (FP) 404 points to an address of an instruction to be fetched from the $BM_1$ 303.

The instruction buffer (IB) 401 stores prefetched data.

The control circuit (IF-CONT) 403 controls the memory access to the $BM_1$ 303 through signal lines 326, instructs write locations in the IB401 of the data fetched from the $BM_1$ 303 and permission or inhibition of writing, through a signal line 21A, and indicates if all data to be decoded in the DU 500 have been fetched to the IB 401, through the signal line 12A.

The incrementer (INC) 406 is used to update the content of the FP 404.

The selector (SEL) 405 selects data to be loaded to the FP 404. The output 23A of the SEL 405 provides the output 22A of the INC 406 when the instruction is to be prefetched and provides a branch address on signal lines 344 connected with an interunit bus 410 when a branch address is to be loaded during the execution of a branch instruction.

The instruction aligner (ALIG) 402 functions to align the operand specifier bit by bit in a sequence of decode by the address 11A. It may comprise a multi-bit shifter which can shift a plurality of bits simultaneously.

Numeral 14A denotes signal lines which provides the output of the ALIG 402 to the DU 500. It has a signal line width equal to the number of bits which includes at least one set of operand specifiers and one set of operation codes and one set of the operand specifiers for the register mode.

Numeral 13A denotes signal lines which carry the number of bits of data necessary to decode in the DU 500.

Those are major elements of the IFU 400. It should be understood that many other elements are included.

Figure 4B:
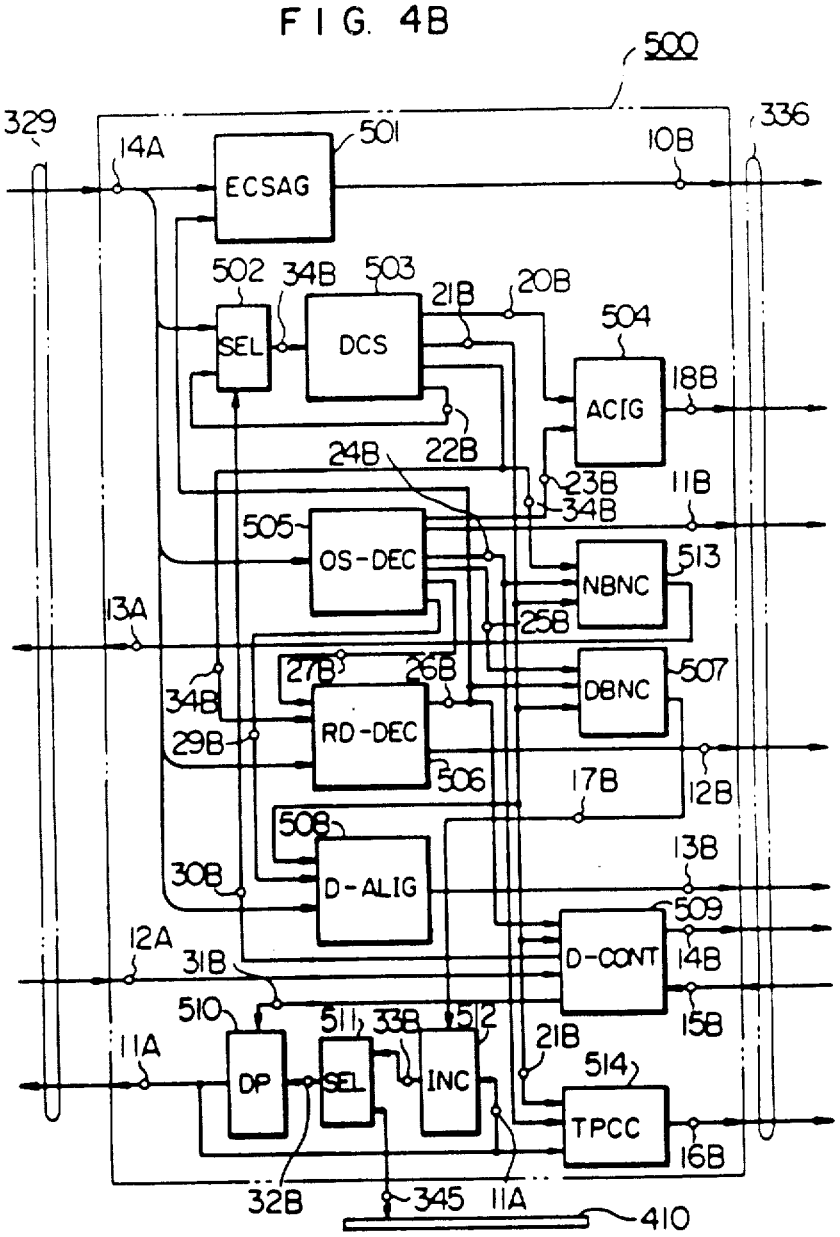

FIG. 4B shows the specific configuration of the instruction decode unit (DU) 500. The abbreviations used therein and their formal names are listed below.

| Reference Numerals | Formal Names | Abbreviations |
|---|---|---|
| 501 | Microprogram address generation circuit | ECSAG |
| 502 | Selector | SEL |
| 503 | Operand information memory | DCS |
| 504 | Control data generation circuit | ACIG |
| 505 | Operand specifier decoder | OS-DEC |
| 506 | Register mode detector | RD-DEC |
| 507 | Number of decode bits calculator | DBNC |
| 508 | Data aligner | D-ALIG |
| 509 | Control circuit | D-CONT |
| 510 | Decode pointer | DP |

BEST AVAILABLE COPY

-continued

| Reference Numerals | Formal Names | Abbreviations |
|---|---|---|
| 511 | Selector | SEL |
| 512 | Incrementer | INC |
| 513 | Number of necessary decode bits calculator | NBNC |
| 514 | Address calculation program counter value calculator | TPCC |

The microprogram address generation circuit (ECSAG) 501 generates a leading microprogram address 10B to be executed in the EU 800 by an operation code provided from the IFU 400 through the signal lines 14A.

The operand information memory (DCS) 503 stores informtion on operands in an operation code provided from the signal lines 14A through the selector (SEL) 502.

The operand specifier decoder (OS-DEC) 505 decodes an operand specifier in the signal lines 14A.

The control data generation circuit (ACIG) 504 generates a control data 18B for calculating an address of an operand in the address calculation unit (AU) [301] *600* by the output 20B of the DCS 503 and the output 23B of the OS-DEC 505.

The register mode detector (RD-DEC) 506 detects if an operand specifier (OS) immediately following the operand specifier (OS) decoded by the OS-DEC 505 is the register mode or not. If it is the register mode and the signal lines 34B permits the simultaneous decode of two operand specifiers, the RD-DEC 506 loads the address 12B of that register to a register (ARR) 610 in the AU 600 to be described later and informs it to the D-COUNT 509, the ECSAG 501 and the DBNC 507 through the signal lines 26B.

The number of decode bits calculator (DBNC) 507 receives the output 25B of the OS-DEC 505, the output 26B of the RD-DEC 506 and the output 21B of the DCS 503 and calculates the number of bits which are to be read out of the IB 401 and decoded in the same cycle.

The data aligner (D-ALIG) 508 receives the output 29B of the OS-DEC 505, the output 14A of the ALIG 402 and the output 21B of the DCS 503 and realigns the literal data, the displacement field or an absolute address if it is included in the OS to be decoded.

The control circuit (D-CONT) 509 receives the signal 12A from the IF-CONT 403, the output 21B of the DCS 503, the output 26B of the RD-DEC 506 and the output 15B of the A-DEC 603 to control the overall operation of the DU 500.

The decode pointer (DP) 510 points to a leading address to be decoded in that machine cycle.

The selector (SEL) 511 selects data to be loaded to the DP 510. In the execution of a branch instruction, when a branch address is set, a branch address provided on the interunit bus 410 is loaded to the DP 510 through the SEL 511.

The incrementer (INC) 512 adds to the content 11A of the DP 510 the number of bits 17B of the instruction decoded in that cycle to produce a leading address 33B to be decoded in the next sequential machine cycle.

The number of necessary decode bits calculator (NBNC) 513 receives the output 24B of the OS-DEC 505 and the outputs 21B and 34B of the DCS 503 and calculates the number of bits which must have been fetched in the IB 401 to be decoded in that cycle and provides the result to the IF-CONT 403 through the signal lines 13A.

The address calculation program counter value calculator (TPCC) 514 receives the output 21B of the DCS 503 and the output 24B of the OS-DEC 505 to calculate a value of the program counter to use the effective address calculation in the addressing mode corresponding to the program counter (the value of the program counter indicating a next sequential address to that of the operand specifier for which the address is to be calculated) and loads the result to a register (TPC) 613 through the signal lines 16B.

Figure 4C:
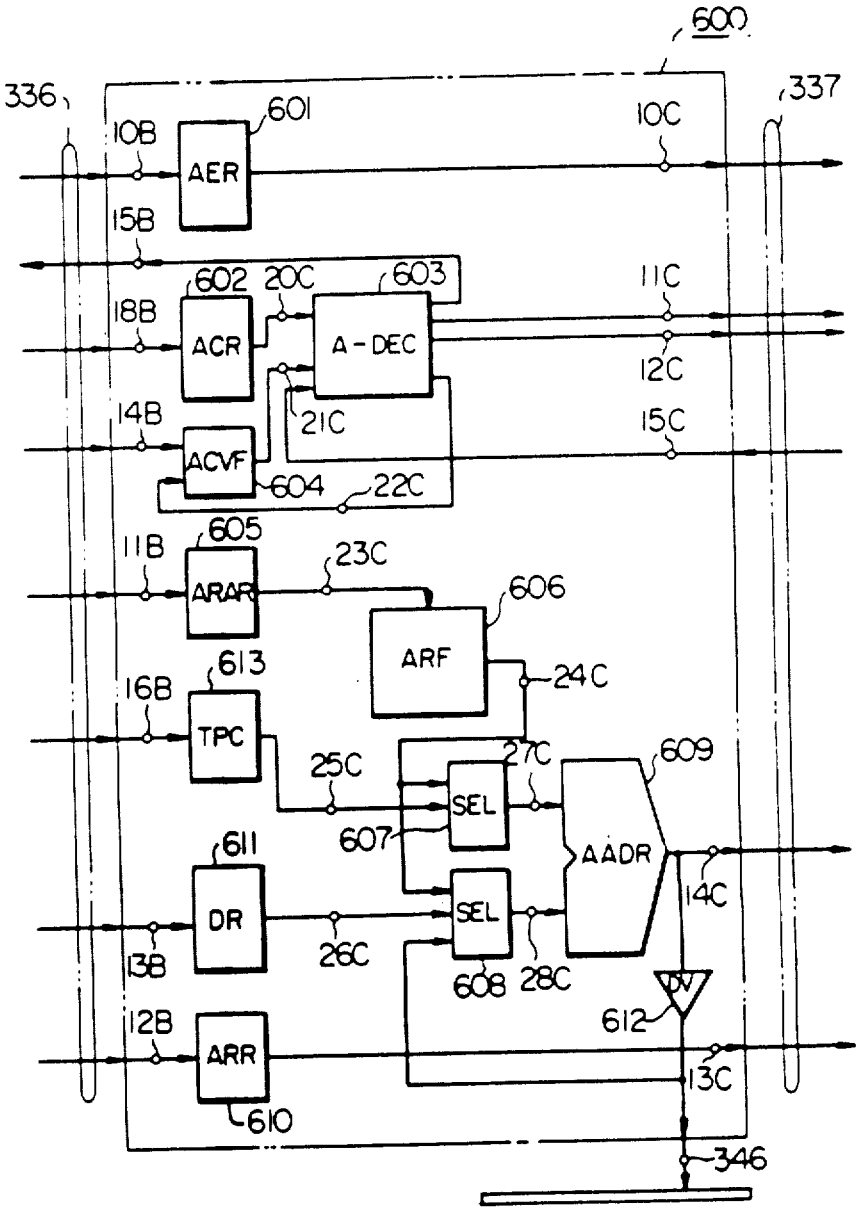

FIG. 4C shows the configuration of the address calculation unit (AU) 600 shown in FIG. 4. The abbreviations used therein and their formal names are listed below.

| Reference Numerals | Formal Names | Abbreviations |
|---|---|---|
| *601* [610] | Register | AER |
| 602 | Register | ACR |
| 603 | Decoder | A-DEC |
| 604 | Flag | ACVF |
| 605 | Register | ARAR |
| 606 | Register file | ARF |
| 607 | Selector | SEL |
| 608 | Selector | SEL |
| 609 | Adder | A-ADR |
| 610 | Register | ARR |
| 611 | Register | DR |
| 612 | Bus driver | DV |
| 613 | Register | TPC |

In FIG. 4C, the register (AER) 601 retains a leading address 10B of a microprogram generated in the ECSAG 501 of FIG. 4B.

The register (ACR) 602 retains control data 18B which is the output of the ACIG 504 of FIG. 4B.

The decoder (A-DEC) 603 controls the overall operation of the AU 600 by the combination of the outputs of the ACR 602 and the flag (ACVF) 604.

The flag (ACVF) 604 functions to indicate the excution of the operation of the AU 600. The ACVF 604 is set when a decoded result is presented to the AU 600 by the output 14B of the D-CONT 509 and is reset by the output 22C of the A-DEC 603 when the address calculation based on the decoded result is completed.

The register (ARAR) 605 stores an address 11B of a register to be referred to when the operand address is calculated.

The register file (ARF) 606 is a group of registers to be referred to when the operand address is calculated. The output 24C which is the output of ARF 606 corresponding to the address output 23C from the ARAR 605 is supplied to the selectors (SEL) 607 and 608.

The selectors (SEL) 607 and 608 select inputs to the adder (A-ADR) 609.

The adder (A-ADR) 609 calculates the address of the operand based on the signals selected by the SEL 607 and 608 and loads the result to a register (MAR) 705 through the signal lines 14C or provides the result to the interunit bus 410 through the bus driver (DV) 612.

The register (ARR) 610 retains the address 12B of the register which is contained in the operand specifier (OS).

The register (DR) 611 retains the displacement, absolute address or literal data which is contained in the operand specifier (OS), and presents it to the SEL 608 through the signal lines 26C.

BEST AVAILABLE COPY

The register (TPC) 613 retains the value of the program counter to be used in the relative addressing mode, and supplies the output 25C to the SEL 607 corresponding to the program calculated.

Figure 4D:
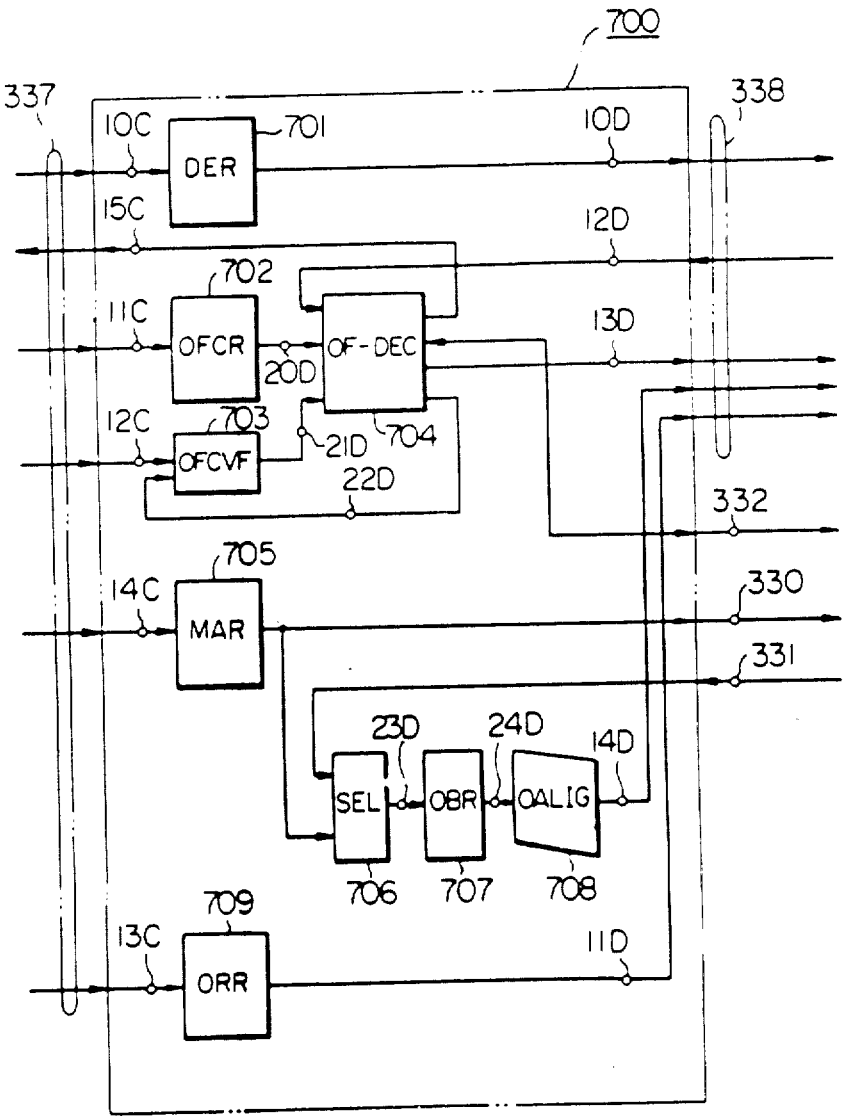

FIG. 4D shows the configuration of the operand fetch unit (OFU) shown in FIG. 4. The abbreviations used therein and their formal names are listed below.

| Reference Numerals | Formal Names | Abbreviations |
|---|---|---|
| 701 | Register | [OER] *DER* |
| 702 | Register | OFCR |
| 703 | Flag | OFCVF |
| 704 | Decoder | OF-DEC |
| 705 | Register | MAR |
| 706 | Selector | SEL |
| 707 | Register | OBR |
| 708 | Data Aligner | OALIG |
| 709 | Register | ORR |

In FIG. 4D, the register [(OER)] *(DER)* 701 retains a leading address 10C of a microprogram.

The register (OFCR) 702 retains the output 11C of the A-DEC 603 of FIG. 4C.

The flag (OFCVF) 703 indicates the execution of the operation of the OFU 700. It is set by the output 12C of the A-DEC 603 when the result of the address calculation is presented to the OFU 700 and reset by the output 22D of the OF-DEC 704 when the operation of the OFU 700 to the address is completed.

The decoder (OF-DEC) 704 controls the overall operation of the OFU 700 by the combination of the output 20D of the OFCR 702 and the output 21D of the OFCVF 703. When all operands have been fetched, it provides the signal 13D to the execution unit 800.

The register (MAR) 705 retains the address 14C of the operand and provides the address to the $BM_2$ 304 through the signal line 330.

The selector (SEL) 706 selects data to be loaded to the register (OBR) 707 which retains the operand 23D to be loaded through the SEL 706.

The data aligner (OALIG) 706 receives the data 24D from the OBR 707 and aligns it to generate the data format 14D.

The register (ORR) 709 retains the address 13C of the register provided from the ARR 610 of FIG. 4C.

Figure 4E:
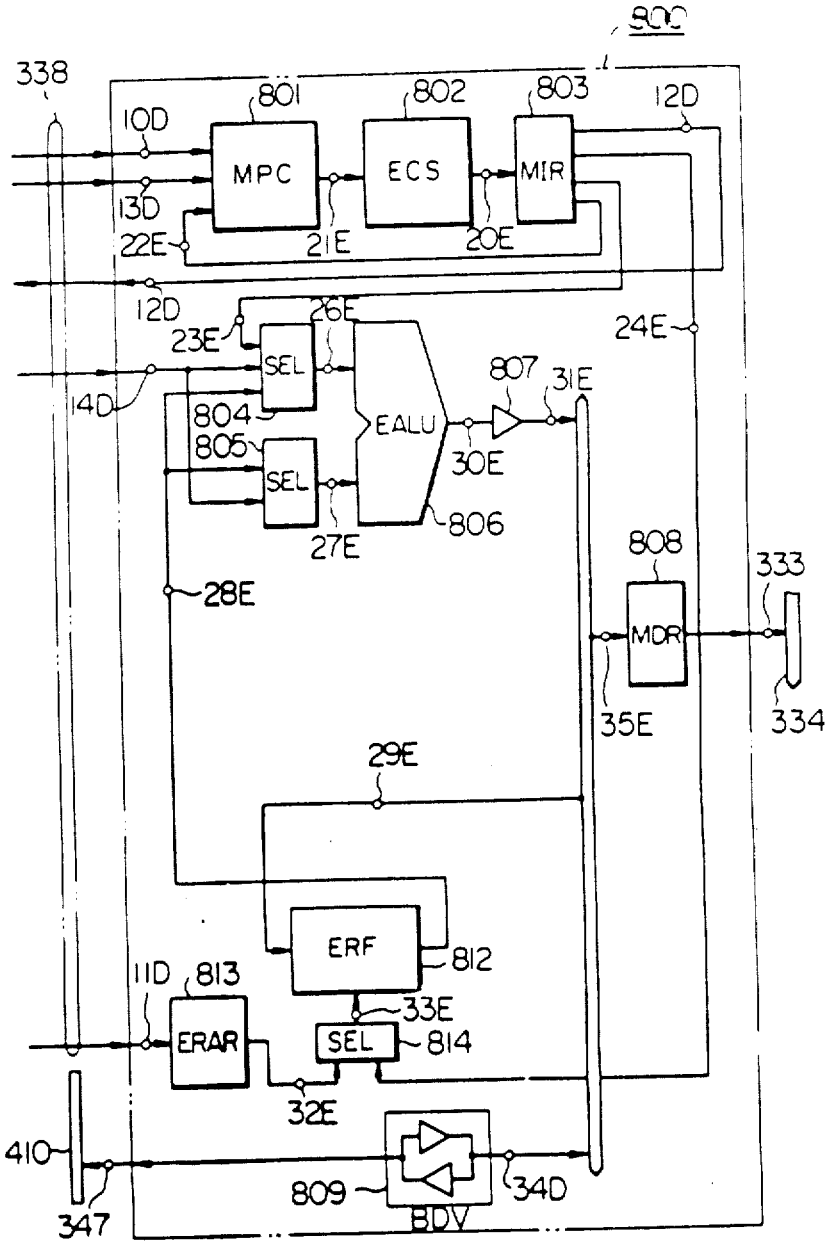

FIG. 4E shows the configuration of the execution unit (EU) 800 shown in FIG. 4. The abbreviations used therein and their formal names are listed below.

| Reference Numerals | Formal Names | Abbreviations |
|---|---|---|
| 801 | Microprogram controller | MPC |
| 802 | Microprogram memory | ECS |
| 803 | Microinstruction register | MIR |
| 804 | Selector | SEL |
| 805 | Selector | SEL |
| 806 | ALU | EALU |
| 808 | Memory data register | MDR |
| 809 | Bilateral bus driver | BDV |
| 812 | General purpose register file | ERF |
| 813 | Register | ERAR |
| 814 | Selector | SEL |

FIG. 4E shows only major elements of the EU 800 and many other elements are included therein although they are not explained here because they are immaterial to an understanding of the present invention.

In FIG. 4E, the microprogram controller (MPC) 801 controls the memory address of the microprogram memory (ECS) 802, which [receives] *provides* the microprogram 20E from the address 21E specified by the MPC 801 and loads it to the microinstruction register (MIR) 803.

The outputs of the MIR 803 are provided to the OF-DEC 704 of FIG. 4D through the signal lines 12D, to the MPC 801 through the signal lines 22E and to the selectors 804 and 814 through the signal lines 23E and [23E,] *24E*, respectively. The outputs of the MIR 803 are also provided to many other elements although they are not shown nor explained here because they are immaterial to an understanding of the present invention.

The selectors 804 and 805 select input data to the ALU (EALU) 806.

The memory data register (MDR) 808 temporarily stores the data 35E from the bus 25E and provides it to the $BM_2$ 304 through the signal lines 333, the bus 334 and the signal lines 335.

The general purpose register file (ERF) 812 is a group of general purpose registers used by the EALU 806. It provides data read out by the address from the output 33E of the SEL 814 to the SEL 804 and 805 through the signal lines 28E.

The register (ERAR) 813 retains the register address 11D which is transferred from the ORR 709 of FIG. 4D.

The selector (SEL) 814 selects either the output 32E of the ERAR 813 or the output 24E of the MIR 803 and provides it to the ERF 812 through the signal line 33E. The bilateral bus driver (BDV) 809 functions to interconnect the internal bus 25E of the EU 800 and the interunit bus 410, transfer the data generated in the EU 800 to the other unit and provide the data transferred from the other unit to the EU 800.

An example of an instruction execution sequence in accordance with the present embodiment is now explained with respect to a basic instruction.

The IFU 400 accesses the $BM_1$ 303 by the address contained in the FP 404 to prefetch the instruction. If the IB 401 has a vacant area to accommodate the data read out of the $BM_1$ 303, it reads in the data. If it has no vacant area, it neglects the data. The presence or absence of the vacant area is determined by the IF-CONT 403 by the content 327 of the FP 404 and the output 11A of the DP 510. In the present embodiment, the data read out from $BM_1$ 303 is stored in the IB 401 when the IB 401 has a larger area than the readout width of the data from the $BM_1$ 303.

The ALIG 402 aligns the data in the IB 401 in the sequence of address with the position at the corresponding address of the IB 401 being at the top while using the output 11A of the DP 510 as the address. In the present embodiment, the data is aligned bit by bit although it may be aligned byte by byte when the basic length of the instruction is a byte. In the first decode cycle of the instruction, the DP 510 indicates the address of the operation code. Accordingly, the leading data from the ALIG 402 corresponds to the operation code field and the operand specifier of the next sequential first operand is read. In the intermediate decode cycle of the instruction, the DP 510 may indicate the address of the operand specifier. In this case, a series of data with the operand specifier corresponding to said address being at the top is read. The output 329 from the ALIG 402 has a width wide enough to accommodate at least one set of operand specifiers and an operation code.

BEST AVAILABLE COPY

The DU 500 decodes the instructions provided by the ALIG 402. The DU 500 always decodes the output 329 of the ALIG 402. Conditions for completing the decoding are explained below.

The effective data length to be available to decode in the IB 401 is determined by a difference between the FP 404 and the DP 510. The FP 404 indicates an address to be read from the memory at the next memory access, and the DP 510 indicates a head memory address to be decoded. Thus, the FP 404 is equal to or in advance of the DP 510. When the DP 510 is equal to the FP 404, there is no effective data in the IB 401. When the DP 510 is not equal to the FP 404, the difference between the FP 404 and the DP 510 indicates the effective data length. The DU 500 calculates the length necessary for decoding by the NBNC 513 and informs the result to the IF-CONT 403 in the IFU 400 through the signal lines 13A. The IF-CONT 403 compares the content on the signal lines 13A with the difference between FP 404 and the DP 510, and when the former is equal to or smaller than the latter it determines that the length necessary for decoding is contained in the IB 401 and informs this to the D-CONT 509 in the DU 500 through the signal lines 12A. When the D-CONT 509 is informed through the signal lines 12A that the necessary data for decoding is contained in the IB 401 and is informed through the signal lines 15B that the AU 600 is ready to receive the decode result, it presents the decode result of the DU 500 to the AU 600 to complete the operation of the decode cycle. If the data necessary for decoding is not contained in the IB 401, or if the AU 600 is not ready to receive the decoded result, the D-CONT 509 invalidates the process in that decode cycle and repeats the same process in the next sequential cycle.

The output 17B of the DBNC 507 is represented by a formula (1):

$$17B = \alpha + \beta + \gamma \quad (1)$$

and the output 13A of the NBNC 513 is represented by a formula (2):

$$13A = \alpha + \beta + \delta \quad (2)$$

where $\alpha$ and $\beta$ are defined as follows:

(i) When the DP 510 indicates the address of the operation code, $\alpha$ = the number of bits of the operation code $\beta$ = the number of bits of the leading operand specifier following said operation code.

(ii) When the DP 510 indicates the address of the operand specifier, $\alpha = 0$ $\beta$ = the number of bits of said operand specifier, $\gamma$ is defined as follows:

(i) When two operand specifiers are simultaneously decoded, $\gamma$ = the number of bits of the operand specifier for the register mode (ii) When only one operand specifier is decoded, $\gamma = 0$ $\delta$ is defined as follows:

(i) When simultaneous decoding of two operand specifiers is permitted (as indicated) by the output 34B of the DCS 503), $\delta$ = the number of bits of the operand specifier for the register mode (ii) When simultaneous decoding of two operand specifiers is not permitted, $\gamma = 0$ In the first decode cycle of the instruction, a leading field provided from the ALIG 402 corresponds to the operation code. Thus, the leading field is used as the address of the DCS 503 in accessing to the DCS 503.

Figure 5:
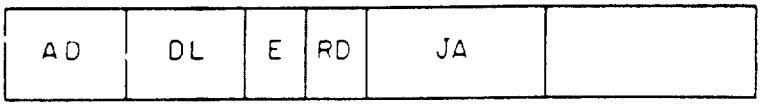
FIG. 5 shows a chart for explaining functions of signals in the circuit shown in FIG. 4B, FIGS. 6 and 7 show flow charts for the operation of the data processing unit shown in FIG. 4.

In the DCS 503, a one-word address is allocated to one operand specifier of each instruction. As shown in FIG. 5, each one-word in the DCS 503 comprises a field (AD) indicating a type of access (read, write or read and write) of one of a plurality of operand specifiers defined by the operation code of the instruction, a field (DL) indicating the data length, a field (JA) indicating an address in the DCS 503 corresponding to the operand specifier following said operand specifier if it is included, a field (E) indicating the last operand specifier of the instruction and a field (RD) indicating the permission for simultaneous decoding of two operand specifiers. Other fields are also included but they are not explained here because they are not directly related to the present invention. A number of words in the DCS 503 equal to the number of operand specifiers contained in each instruction are allotted to each instruction. For example, three words are allotted to a three-operand instruction. It is possible to reduce the memory size of the DCS 503 by sharing the same address by different instructions if such sharing is permitted. In a first decode cycle ($t_1$) of an instruction, the operation code is used as the address of the DCS 503, and a first operand information specified by the operation code, an address (JA) on the DCS 503 of a second operand and other information are read out of the DCS 503. The operand specifier of the first operand is read out from the IB 401 by the ALIG 402 and decoded by the OS-DEC 505. If the operand specifier includes a displacement, an absolute address or literal data, the D-ALIG 508 reads them out and aligns the data format, which is then stored in the DR 611. The DU 500 loads the decoded results to the registers in the AU 600 and sets the ACVF 604 to start the address calculation for the operand specified by the operand specifier in accordance with the decoded result. The number of bits of the instructions decoded in that cycle (the number of bits of the operation codes and the operand specifiers for the first operands) is calculated by the DBNC 507 and it is added to the content of the DP 510 by the INC 512 to update the content of the DP 510.

When the instruction has two or more operand specifiers, the information of the second operand specified by the operation code is read out of the DCS 503 in the next cycle ($t_2$) to the first decode cycle ($t_1$) for the instruction while using the field JA in the information read out of the DCS 503 in the cycle $t_1$ as an address. Simultaneously, the operand specifier for the second operand is read out of the IB 401 by the ALIG 402 and it is decoded by the OS-DEC 505 in a similar procedure to that of decoding of the operand specifier for the first operand. If the AU [310] *600* has received the decoded result of the operand specifier for the first operand and completed the address calculation for the operand by that time and is ready to accept the address calculation for the next address, the DU 500 loads the decoded result of the operand specifier for the second operand to the registers in the AU 600 and sets the ACVF 604 to cause the AU 600 to start the address calculation of the operand specified by the operand specifier for the second operand. The number of bits of

BEST AVAILABLE COPY the instruction decoded in that cycle (the number of bits of the operand specifier for the second operand) is calculated by the DBNC 507 and it is added to the content of the DP 510 to update the content of the DP 510.

As is apparent from the above description, the DU 500 decodes one operand specifier in each machine cycle and loads the decoded result to the registers in the AU 600 and instructs the AU 600 to calculate the address of the operand based on the decoded result. In the first decode cycle of the instruction, the operation code is used as the address of the DCS 503 and in the subsequent cycles the information specified by the operation code is read out. The leading address of the microprogram is determined by the ECSAG 501 based on the operation code and it is loaded to the AER 601.

When the decoded result for the operand specifier is loaded to the registers in the AU 600 from the DU 500 and the ACVF 604 is set, the AU 600 calculates the address of the operand based on the decoded result, loads the calculated operand address to the MAR 705 in the OFU 700, loads the operation control information for the OFU 700 to the OFCR 702, and sets the OFCVF 703 to cause the OFU 700 to start the memory access to the address specified by the MAR 705. When the address calculation of the operand specifier for the operand has been completed, the AU 600 receives the next operand specifier following said operand specifier from the DU 500 and calculates the address of the next operand specifier. In this manner, the AU 600 sequentially calculates the addresses of the operands specified by the operand specifiers, one operand specifier at a time. The address calculation for each operand specifier is not always completed in one machine cycle, but it may sometimes take a plurality of machine cycles. After the address calculation for one operand specifier is completed, the address calculation for the next operand specifier is carried out. It is not necessary that the next operand specifier belong to the same instruction as that of the foregoing operand specifier. When the address calculation for the leading (first) operand specifier in the instruction is completed, the AU 600 transfers the leading address of the microprogram of the instruction stored in the AER 601 to the [OER] *DER* 701 of the OFU 700.

In order to transfer the address calculated by the AU 600 to the OFU 700, the OFU 700 must be ready to receive the data from the AU 600. The OFU 700 indicates through the signal line 15C if it is ready to receive the data from the AU 600. In the data transfer cycle to the OFU 700, the AU 600 checks the signal line 15C and only when it determines that the OFU is ready, the AU 600 loads the data generated therein to the registers in the OFU 700. When the OFU 700 is not ready to receive the data, the AU 600 invalidates the process of that cycle and repeats the same process in the next cycle.

The OFU 700 starts its operation when the calculated address of the operand specifier is loaded to the MAR 705 from the AU 600, the operation control signal for the OFU 700 is loaded to the OFCR 702 and the OFCVF 703 is set.

A primary function of the OFU 700 is to access the memory based on the address presented by the AU 600 to fetch the operand. In an addressing mode (e.g. immediate mode or literal mode) in which the operand has been prepared by the AU 600, the operand (to be presented to the MAR 705) is loaded to the OBR 707 through the SEL 706 and the memory is not accessed.

In several modes which need the memory access, the $BM_2$ 304 is accessed through the signal lines 332. The data read out of the $BM_2$ 304 is loaded to the OBR 707 through the SEL 706. The operands in the OBR 707 are aligned by the OALIG 708 and then transferred to the EU 800.

In the memory access or transfer of the leading (first) operand specifier of the instruction, the leading address of the microprogram stored in the OER 701 is transferred to the MPC 801.

In order to load the operand prepared in the OFU 700 to the OBR 707, the OBR 707 must contain no data prior to said operand, that is, the OBR 707 must be vacant. The EU 800 indicates through the signal line 12D if the operand in the OBR 707 has been used. In the loading cycle of the operand to the OBR 707, the OFU 700 determines if the OBR 707 is ready to receive the operand. If it is ready, the OFU 700 loads the operand, and if it is not ready the OFU 700 invalidates the process of that cycle and repeats the same process in the next cycle.

As described above, the information (operation code and operand specifier) on the instruction decoded by the DU 500 is transferred to the EU 800 through the AU 600 and the OFU 700.

The EU 800 accesses the ECS 802 by the leading address of the microprogram presented to the MPC 801 to fetch the microprogram to initiate the execution of the instruction. The operand specified by the operand specifier is presented from the OBR 707, or from the ERAR 813 as a register address. If the operand is a destination, the address of that operand is loaded to the MAR 705. The EU 800 executes the instruction using the operands presented from the OFU 700. When the result is to be stored in a register, it is stored in the ERF 812 through the bus 25E and the signal lines 29E. When the result is to be stored in a memory, it is temporarily stored in the MDR 808 and supplied to the $BM_2$ 304 through the signal lines 333. When the operands presented by the OFU 700 have been processed, it is indicated to the OFU 700 through the signal line 12D to make the OFU 700 ready for the receipt of the next operand.

Figure 6:
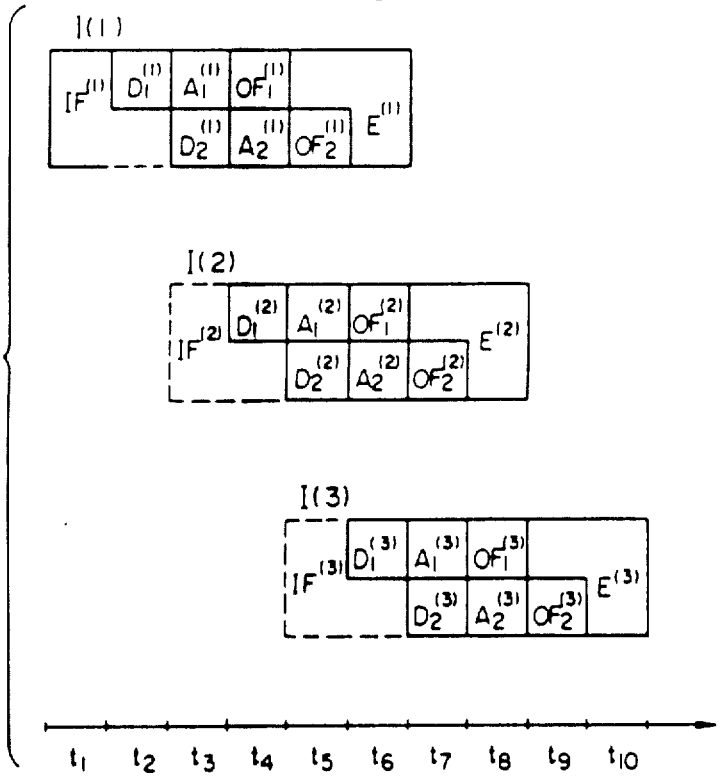

FIG. 6 shows a stage flow illustrating an instruction flow and a process for executing the instructions, in which three instructions I(1), I(2) and I(3) are shown. Each of the instructions I(1) to I(3) has two operand specifiers. In the first cycle ($t_1$), the instruction I(1) is fetched ($IF^{(1)}$). In the next cycle ($t_2$), the operation code and the operand specifier of the first operand are decoded ($D^{(1)}1$). In the next cycle ($t_3$), the effective address of the first operand is calculated ($A^{(1)}1$) in accordance with the decode result and the operand specifier of the second operand is decoded ($D^{(1)}2$). In the next cycle ($t_4$), the first operand is fetched ($OF^{(1)}1$) and the effective address of the second operand is calculated ($A^{(1)}2$). In the same cycle, the operation code and the operand specifier of the first operand of the instruction I(2) are decoded ($D^{(2)}1$). In the next cycle, ($t_5$), the second operand of the instruction I(1) is fetched ($OF^{(1)}2$) and the effective address of the first operand of the instruction I(2) is calculated ($A^{(2)}1$) and the operand specifier of the second operand of the instruction I(2) is decoded ($D^{(2)}2$). In the next cycle ($t_6$), the instruction I(1) is executed ($E^{(1)}$), and the first operand of the instruction I(2) is fetched ($OF^{(2)}1$), the effective address of the second operand is calculated ($A^{(2)}2$) and the operation code and the operand specifier of the first

BEST AVAILABLE COPY operand of the instruction I(3) are decoded ($D^{(3)}1$). Similar processes are carried out in the cycles [$t_7$–$t_{11}$.] $t_7$–$t_{10}$. The fetches ($IF^{(2)}$, $IF^{(3)}$) of the instructions I(2) and I(3) shown by broken lines in FIG. 6 indicate that instruction prefetches are carried out even when vacant areas in the IB 401 exceed a predetermined number of bits.

While FIG. 6 shows an example where the effective address calculation cycle for the operand and the operand and fetch cycle are completed in one cycle, respectively, the effective address calculation cycle may not be completed in one cycle depending on the addressing mode, or the operand may be fetched by twice referring to the memory in the indirect addressing mode (in which an operand is presented by the first memory reference). Accordingly, the instruction flow and the execution vary depending on the addressing mode.

Figure 7:
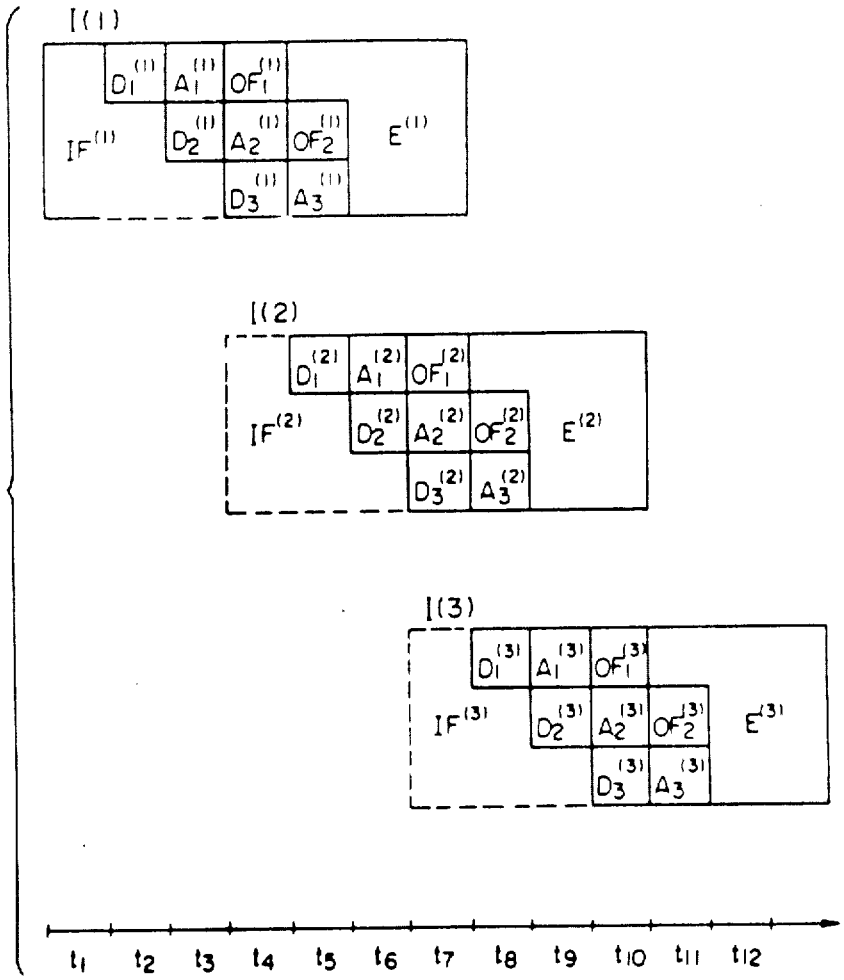

FIG. 7 shows a stage flow illustrating an instruction flow and the execution of the instructions when three-operand instructions are sequentially executed, in which three instructions I(1), I(2) and (3) are shown, as in the case of FIG. 6. The execution of the instructions in each cycle is similar to that for the sequential two-operand instructions explained in FIG. 6. In the three-operand instruction, however, the third operand is not fetched because it is usually not a source operand but a destination operand. A stage flow for the instructions having more than three operands is essentially the same as the stage flows for the two-operand and three-operand instructions described above in connection with FIGS. 6 and 7. A combination of instructions having different numbers of operand specifiers may also be executed in a similar manner.

While the two-operand and three-operand instructions have been illustrated, it should be understood that the stage flows for one-operand instructions and the instructions having more than three operands are essentially the same as those shown in FIGS. 6 and 7.

The simultaneous decoding process for two operand specifiers and subsequent processes in an instruction which permits simultaneous decoding of the two operand specifiers are now explained.

The simultaneous decoding of the two operand specifiers is carried out only for the instruction which permits the simultaneous decoding of the two operand specifiers although it may be carried out for all of the instructions.

Figure 8:
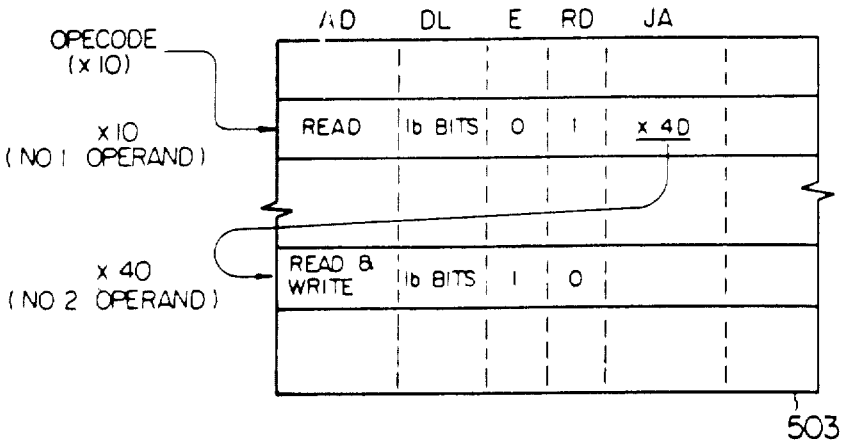
FIG. 8 shows a chart for illustrating a signal for a specific instruction in the circuit shown in FIG. 4B, and FIGS. 9 and 10 show flow charts for the operation for a specific instruction in the data processing unit shown in FIG. 4.
Figure 9:
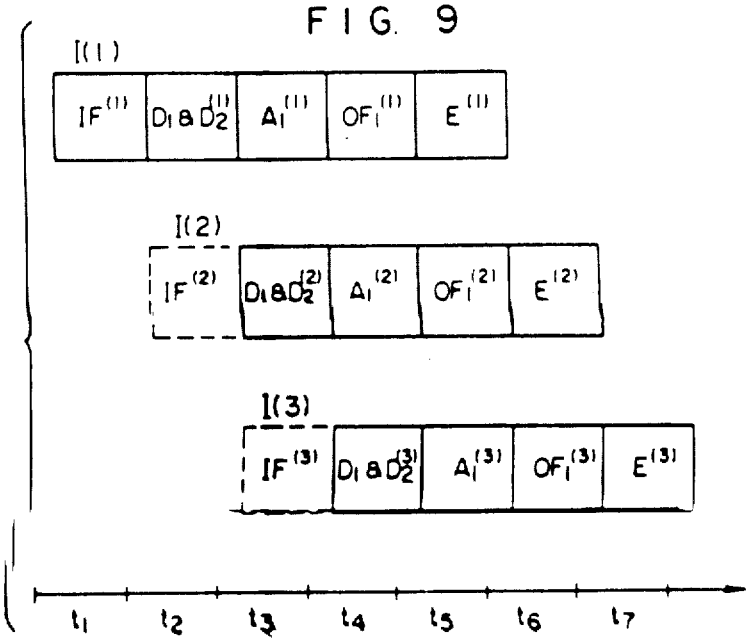

The simultaneous decoding of the two operand specifiers is carried out on condition that the addressing mode of the last operand specifier is the register mode when an operand specifier preceding the last operand specifier is decoded. If the addressing mode is not the register mode, the simultaneous decoding is not carried out but only the operand specifier preceding the last operand specifier is decoded. As an example, an add instruction having two operand specifiers is explained. In the add instruction, the content of the first operand is added to the content of the second operand and the sum of them is stored at the location of the second operand. Thus, the first operand is a read operand and the second operand is a read and write operand. Patterns of the DCS 503 for the add instruction are shown in FIG. 8, in which information of the first operand and the address of the second operand on the DCS 503 are contained at the address of the DCS 503 corresponding to the content of the operation code. Since the first operand is the operand preceding the last operand, the field RD of the DCS 503 contains "1" (indicating the permission of the simultaneous decode of the two operand specifiers). Information of the second operand is stored at the address of the DCS 503 for the second operand and the field E contains "1" indicating that the second operand is the last operand of the instruction. FIG. 9 shows a stage flow when add instructions having the same type of operand specifiers are sequentially executed and the second operands are of the register mode. When the second operands are not of the register mode, the stage flow is not as shown in FIG. 9, but the stage flow is similar to that shown in FIG. 6.

Referring to FIG. 9, the execution of the instructions is explained. In the first cycle ($t_1$), the data (instruction) on the address containing the instruction I(1) is fetched ($IF^{(1)}$). In the next cycle ($t_2$), the operation code and the operand specifier of the first operand of the instruction I(1) are decoded. If the field RD of the DCS 503 contains "1" and the RD-DEC 506 in the DU 500 detects that the addressing mode of the operand specifier of the second operand following the operand specifier of the first operand is the register mode, the RD-DEC 506 reads out a register address from the operand specifier of the second operand and loads it to the ARR 610 in the AU 600 to simultaneously decode the two operand specifiers ($D1$ & $D2^{(1)}$). In the next cycle, ($t_3$), the AU 600 calculates the address of the first operand of the instruction I(1) ($A1^{(1)}$) based on the decoded result and transfers the calculated address to the OFU 700 and transfers a register address of the second operand of the instruction I(1) to the ORR 709 in the OFU 700. In the same cycle $t_3$, the DU 500 decodes the instruction I(2) ($D1$ & $D2^{(2)}$) in the same manner as in the cycle $t_2$. In the next cycle ($t_4$), the OFU 700 fetches the first operand of the instruction I(1) ($OF1^{(1)}$) and transfers the register address of the second operand of the instruction I(1) to the EU 800. In the same cycle $t_4$, the AU 600 calculates the address of the first operand of the instruction I(2) ($A1^{(2)}$) and transfers the address to the OFU 700 and transfers the register address of the second operand of the instruction I(2) to the OFU 700. In the same cycle $t_4$, the DU 500 decodes the instruction I(3) ($D1$ & $D2^{(3)}$) in the same manner as in the decode for the instruction I(1) in the cycle $t_2$. In the next cycle ($t_5$), the EU 800 receives the register addresses of the first operand of the instruction I(1) and the second operand of the instruction I(1) from the OFU 700 to execute the instruction I(1) ($E^{(1)}$). In the same cycle $t_5$, the OFU 700 fetches the first operand of the instruction I(2) ($OF1^{(2)}$) and transfers the register address of the second operand of the instruction I(2) to the EU 800. In the same cycle $t_5$, the AU 600 calculates an address of the first operand of the instruction I(3) ($A1^{(3)}$) and transfers the address to the OFU 700 and transfers a register address of the second operand of the instruction I(3) to the OFU 700. In the following cycles $t_6$ and $t_7$, similar processes are carried out. While the effective address calculation cycle of the operand and the operand fetch cycle are completed in one cycle, respectively, in the example of FIG. 9, the effective address calculation cycle may not be completed in one cycle depending on the addressing mode or a plurality of cycles may be required when the required data is not contained in the $BM_2$ 304 in the operand fetch cycle and it has to be fetched from the MM 301. Accordingly, various instruction flows and execution processes may be included.

Figure 10:
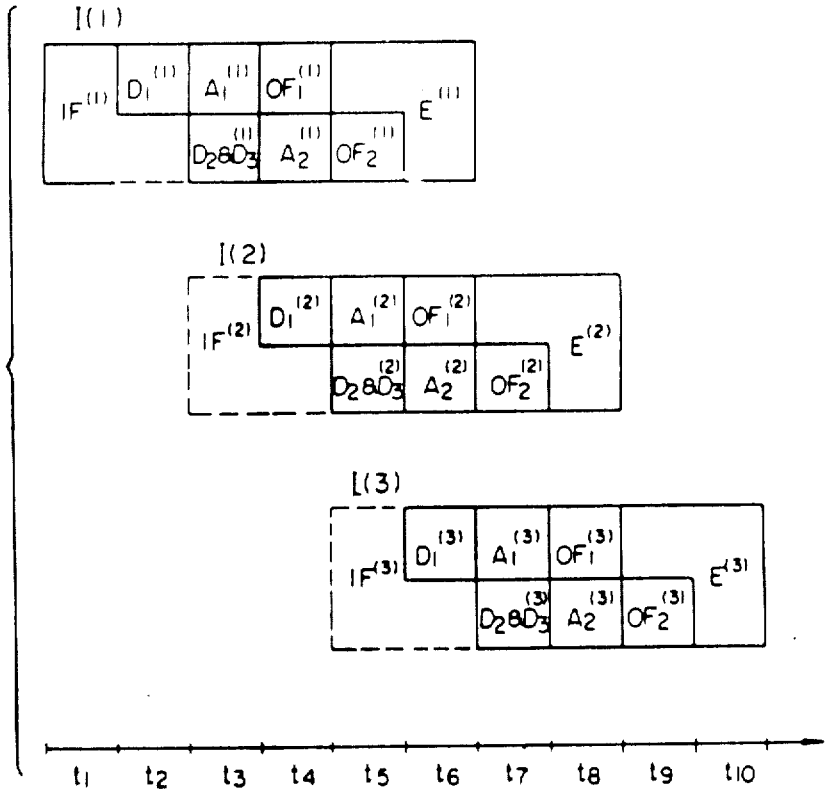

FIG. 10 shows a stage flow illustrating an instruction flow and the execution of the instructions when same type of three-operand instructions are sequentially exe-

BEST AVAILABLE COPY cuted. Similar to FIG. 9, three instructions I(1), I(2), and I(3) are shown in FIG. 10. Also similar to FIG. 9, each of the instructions permits simultaneous decoding of two operand specifiers in a decode cycle of an operand preceding the last operand when the last operand is of the register mode. FIG. 10 shows the stage flow when the last operand (which corresponds to the third operand) is of the register mode. When the third operand is not of the register mode, the stage flow is not the same as shown in FIG. 10, but the stage flow is similar to that shown in FIG. 7. In the two operand instructions shown in FIG. 9, two operand specifiers are decoded in the decode cycle for the operand specifier of the first operand, but in the three-operand instructions shown in FIG. 10, two operand specifiers are decoded in the decode cycle for the operand specifier of the second operand. This difference is due to the fact that the operand preceding the last operand is the first operand in the two-operand instructions while it is the second operand in the three-operand instructions, and it is not an essential difference.

While the processes for the two-operand instructions and the three-operand instructions have been shown in FIGS. 9 and 10, respectively, it should be understood that for the instructions having four or more operands the two operand specifiers can be simultaneously decoded in the decode cycle of the operand specifier of the operand preceding the last operand of the instruction when the last operand is of the register mode. A combination of instructions having different numbers of operands may be similarly executed.

What is claimed is:

1. A data processing unit for executing variable length instructions in which operand specifiers for specifying addressing modes of operands are independent from operation codes for ascertaining operations, comprising:

(A) instruction fetch means connected to memory means for storing instructions and operands, said instruction fetch means including, (1) instruction prefetch means for prefetching and retaining instructions from said memory means, and (2) instruction alignment means for aligning bit sequences of instructions including at least one operand specifier prefetched from said memory means;

(B) instruction decoding means connected to said instruction fetch means, said instruction decoding means including, (1) a first operand specifier decoding means and a second operand specifier decoding means both connected to said instruction alignment means, said second operand specifier decoding means being capable of decoding a next sequential operand specifier received from said instruction alignment means in the same machine cycle as a first operand specifier; and (2) operation code decoding means connected to said instruction alignment means for ascertaining the operand specifiers included in the instruction from said instruction alignment means and ascertaining the function of said instruction, said [operand] *operation code* decoding means including a simultaneous decode permission means for issuing a signal to permit simultaneous decoding of two operand specifiers within the same machine cycle, said permission signal being provided to said second operand specifier decoding means, said second operand specifier decoding means decoding the next sequential operand specifier to the operand specifier decoded by said first operand specifier decoding means only when said permission signal is provided thereto; and (C) address calculation means connected to said instruction decoding means for calculating an effective address of the operand in accordance with information of an operation code and operand specifiers decoded by said instruction decoding means in the previous machine cycle, whereby said instruction fetch means, said instruction decoding means and said address calculation means carry out their processes in parallel, and said instruction decoding means and said address calculation means carry out their process for each operand specifier.

2. A data processing unit according to claim 1 wherein said simultaneous decode permission means provides said permission signal only when said second operand specifier decoding means is in a register designation mode.

3. A data processing unit according to claim 1, wherein said instruction prefetch means includes:

(1) instruction buffer means connected to said memory means, said instruction buffer means retaining instructions prefetched from said memory means, and (2) a fetch pointer connected to said memory means for applying to said memory means an address of an instruction to be prefetched to said instruction buffer means.

4. A data processing unit according to claim 3, wherein said instruction decoding means further includes a decode pointer means for pointing to a leading address to be decoded, and wherein said instruction fetch means includes alignment means connected to an instruction buffer means and said decode pointer for aligning sequential data from the address of said instruction buffer means pointed to by said decode pointer such that said data includes at least one operand specifier.

5. A data processing unit according to claim 3, wherein said instruction prefetch means further includes:

instruction fetch control means connected to said memory means, said instruction fetch control means prefetching an instruction from said memory when said instruction buffer means has a vacant area.

6. A data processing unit according to claim 2, wherein said instruction decoding means further includes:

a decode pointer means for pointing to a leading address to be decoded, and wherein said instruction fetch means includes alignment means connected to an instruction buffer means and said decode pointer, said alignment means aligning sequential data from the address of said instruction buffer means pointed to by said decode pointer such that said data includes operation codes and at least one operand specifier in a first decode cycle of an instruction, and at least one operand specifier in a subsequent decode cycle of the instruction.

BEST AVAILABLE COPY

7. A data processing unit for executing variable length instructions in which operand specifiers for specifying addressing modes of operands are independent from operation codes for ascertaining operations, comprising:

(A) instruction fetch means connected to memory means for storing instructions and operands, said instruction fetch means including:

(1) instruction buffer means connected to said memory means, for retaining instructions prefetched from said memory means, (3) a fetch pointer connected to said memory means for applying to said memory means an address of an instruction to be prefetched into said instruction buffer means, and (3) instruction alignment means connected to said instruction buffer means, for aligning bit sequences of instructions prefetched from said memory means in the order of their address, for outputting a bit sequence including an operation code and at least one operand specifier in a first decode cycle, and for outputting a bit sequence including at least one operand specifier in a succeeding decode cycle;

(B) instruction decoding means connected to said instruction fetch means, said instruction decoding means including:

(1) operation code decoding means connected to said instruction alignment means for ascertaining the operand specifiers included in instruction aligned by said instruction alignment means and ascertaining the function of said instruction, and (2) operand specifier decoding means connected to said instruction alignment means for decoding one or more operand specifiers aligned by said instruction alignment means in the same machine cycle, and (C) address calculation means connected to said decoding means for calculating an effective address of the operand in accordance with an operation code and operand specifiers decoded by said decoding means in the previous machine cycle, whereby said instruction fetch means carries out instruction fetching independently of the instruction decoding means and of the address calculation means, said instruction decoding means operates, utilizing an operand specifier as a basic processing unit of, independently of the instruction fetch means and of the address calculation means, and said address calculation means operates, utilizing an operand specifier as a basic unit of processing, independently of the instruction fetch means and of the instruction decoding means, thereby carrying out pipelined processing based on a unit of one or more than one simultaneously processed operand specifiers.

8. A data processing unit according to claim 7, wherein said instruction fetch means includes instruction fetch control means connected to said memory means and said instruction decoding means for fetching an instruction from said memory means when there occurs a vacant area in said instruction buffer means, comparing the effective data length of the vacant area in said instruction buffer means with the data length necessary to a decoding operation, and giving permission for decoding to said decoding means.

9. A data processing unit according to claim 8, wherein said instruction decoding means further includes:

(1) a decode pointer connected to said instruction fetch control means for applying a leading address to be decoded to said instruction fetch control means and to said instruction alignment means, (2) instruction decode length calculation means connected to said instruction fetch control means for calculating the length of instruction to be decoded and providing the calculated length to said instruction fetch control means, and (3) decoding control means connected to said instruction fetch control means and said address calculation means for receiving signals from said instruction fetch control means and said address calculation means to control the overall operation of said decoding means.

10. A data processing unit according to claim 8, wherein said decode length calculating means calculates the sum of the length of the operation code and the length of the operand specifier of the first operand following the operation code when the operation code is included in the decoding process, and calculates the length of an operand specifier when the operation code is not included in the decoding process, and provides the calculated length to said instruction fetch control means.

11. A data processing unit according to claim 9 wherein said instruction diode length calculation means includes means operative, when the simultaneous decode of two operand specifiers is permitted, to further add the length of an operand specifier of a register designation mode and provide the resulting sum to said instruction control means.

12. A data processing unit according to claim 9, wherein said instruction decoding means further includes: address calculation program counter value calculation means connected to said instruction fetch means and said address calculation means, said address calculation program counter value calculation means calculating a program counter value used in the address calculation in a program relative mode of an operand specifier to be decoded, based on the decode results from said operation code decoding means and said operand specifier decoding means and the information of the leading address to be decoded from said decode pointer, and providing the calculated count to said address calculation means.

13. A data processing unit according to claim 9, wherein said alignment means includes a multi-bit shifter capable of shifting a plurality of bits simultaneously, the number of times of shift being indicated by said decode pointer.

14. A data processing unit according to claim 9, wherein said address calculation means includes:

(1) decode result retaining means connected to said instruction decoding means, said decode result retaining means retaining information decoded by said instruction decoding means, (2) calculation means connected to said decode result retaining means, said calculation means calculating an execution address of an operand, based on the information from said decode result retaining means, and (3) address calculation control means connected to said decoding control means, said address calculation control means being operative when a decode

BEST AVAILABLE COPY result for at least one operand specifier is loaded to said decode result retaining means for causing said calculation means to calculate the effective address of the operand based on the decode result and providing to said decoding control means information indicating whether the decode result can be loaded to said decode result retaining means.

15. A data processing unit according to claim 14, wherein said decode result retaining means includes:

(1) control data latch means for latching control data necessary to calculate the address, (2) register address latch means for latching register addresses included in an operand specifier, (3) displacement latch means for latching displacement, literal data and absolute address information included in an operand specifier and (4) address calculation start signal latch means for latching a signal indicating the start of the address calculation of an operand based on the decode result.

16. A data processing unit according to claim 9 wherein said instruction decoding means further includes:

(1) decode pointer updating means connected to said decode pointer, said decode pointer updating means adding to the content of said decode pointer the length of an instruction decoded in the decode cycle and sending the resulting sum to said decode pointer as a leading address to be decoded next, and (2) instruction decode length calculation means connected to said operation code decoding means and said first operand specifier decoding means, said instruction length calculation means calculating a sum of the length of the operation code and the length of an operand specifier of a first operand following to the operation code in a decode cycle including the operation code and calculating the length of the operand specifier in a decoding cycle including no operation code and presenting the calculated length to said decode pointer updating means as a decoded instruction length.

17. A data processing unit according to claim 16 wherein said instruction decode length calculation means includes means operative, when the simultaneous decode of the two operands is permitted, to further add the length of the operand specifier of the register designation mode and provide the resulting sum to said decode pointer updating means.

*18. A data processing unit for executing variable length instructions in which operand specifiers for specifying addressing modes of operands are independent from operation codes for ascertaining operations, comprising:*

*first means for storing data including variable length instructions and certain of the operands to be executed by certain of the instructions;*

*second means for prefetching an instruction from said first means, for retaining the prefetched instruction, and for aligning a predetermined sequence of elements of the instruction including at least one operand specifier;*

*third means for decoding an operation code and each operand specifier of an aligned instruction received from said second means, for calculating the effective address for the operand specified by each operand specifier in accordance with the decoded operation code, for fetching the operand from said first means in accordance with the calculated effective address for each operand specifier, and for retaining the fetched operands;*

*fourth means for controlling said third means so that said decoding and said address calculating are executed independently and at different times for each operand specifier, with one operand specifier being decoded while an effective address for an operand corresponding to another preceding operand specifier is being calculated; and* fifth means for executing the instruction in accordance with the decoded operation code and the retained operand.

*19. A data processing unit according to claim 18, wherein said fourth means includes means for controlling the decoding by said third means so as to decode two operand specifiers simultaneously in case of a last operand specifier of the instruction having a register mode and for controlling said address calculation by said third means so as to not calculate the effective address for the operand corresponding to the register mode operand specifier, the decoded data of the register mode operand specifier being treated as the effective address for the register directly.*

*20. A data processing unit according to claim 18, wherein said third means includes means for providing a two operand specifier decoding permission signal in response to certain operation codes, and said fourth means includes means for controlling the decoding by said third means so as to decode two operand specifiers simultaneously when said two operand specifier decoding permission signal is provided and the last operand specifier of the instruction is in a register mode, and for controlling said address calculation by said third means so as to not calculate the effective address for the operand corresponding to the register mode operand specifier, the decoded data of the register mode operand specifier being treated as the effective address for the register directly.*

*21. A data processing unit for executing variable length instructions in which operand specifiers for specifying addressing modes of operands are independent from operation codes for ascertaining operations, comprising:*

*first means for storing data including variable length instructions and certain of the operands to be executed by certain of the instructions;*

*second means for accessing said first means to exchange data with said first means;*

*third means for prefetching an instruction from said second means, for retaining the prefetched instruction, and for aligning a predetermined sequence of elements of the instruction including at least one operand specifier;*

*fourth means for decoding an operation code and each operand specifier of an aligned instruction received from said third means, for calculating the effective address for the operand specified by each operand specifier in accordance with the decoded operation code, for fetching the operand from said second means in accordance with the calculated effective address for each operand specifier, and for retaining the fetched operands;*

*fifth means for controlling said fourth means so that said decoding and said address calculating are executed independently and at different times for each operand specifier, with one operand specifier being decoded while an effective address for an operand corresponding to another preceding operand specifier is being calculated; and*

BEST AVAILABLE COPY

*sixth means for executing the instruction in accordance with the decoded operation code and the retained operand.*

*22. A data processing unit for executing variable length instructions in which operand specifiers for specifying addressing modes of operands are independent from operand codes for ascertaining operations, comprising:*

*(A) instruction fetch means connected to memory means for storing instructions and operands, said instruction fetch means including,*

*(1) instruction prefetch means for prefetching and retaining instructions from said memory means, and*

*(2) instruction alignment means for aligning bit sequences of instructions including at least one operand specifier prefetched from said memory means;*

*(B) instruction decoding means connected to said instruction fetch means, said instruction decoding means including,*

*(1) operand specifier decoding means connected to said instruction alignment means for decoding a next sequential operand specifier received from said instruction alignment means simultaneously with a preceding operand specifier and*

*(2) operation code decoding means connected to said instruction alignment means for decoding the operation code included in the instruction from said instruction alignment means and ascertaining the function of said instruction, said operation code decoding means including a simultaneous decode permission means for issuing a signal to permit simultaneous decoding of two operand specifiers within the same machine cycle, said permission signal being provided to said operand specifier decoding means to permit the decoding of the next sequential operand specifier simultaneously with decoding of the preceding operand specifier, and*

*(C) address calculation means connected to said instruction decoding means for calculating an effective address of the operand in accordance with information of an operation code and operand specifiers decoded by said instruction decoding means in the previous machine cycle,*

*whereby said instruction fetch means, said instruction decoding means and said address calculation means carry out their processes in parallel, and said instruction decoding means and said address calculation means carry out their process for each operand specifier.*

*23. A data processing unit according to claim 22 wherein said operand specifier decoding means operates to decode the next sequential operand specifier simultaneously with the decoding of the preceding operand specifier only when said permission signal is provided thereto and the addressing mode of said next sequential operand specifier is a register mode.*

• • • • •